(12) United States Patent
Unger et al.

(10) Patent No.: US 8,416,679 B2
(45) Date of Patent: Apr. 9, 2013

(54) SYSTEMS AND METHODS FOR TRANSMISSION OF ALARM INDICATION SUPPRESSION MESSAGES IN CONNECTION WITH FAILURE OF NETWORK ELEMENT EQUIPMENT

(75) Inventors: Stephen John Unger, Allen, TX (US); David Joseph Haas, Mahwah, NJ (US); Jian-Lin Mu, Ramsey, NJ (US); Virgil Vladescu, Hillsdale, NJ (US); Nimer Yaseen, Allen, TX (US)

(73) Assignee: Fujitsu Limited, Kawasaki-shi (JP)

( * ) Notice: Subject to any disclaimer, the term of this patent is extended or adjusted under 35 U.S.C. 154(b) by 331 days.

(21) Appl. No.: 12/777,660

(22) Filed: May 11, 2010

(65) Prior Publication Data
US 2011/0280120 A1    Nov. 17, 2011

(51) Int. Cl.
*G01R 31/08* (2006.01)
(52) U.S. Cl. ............................................. 370/216
(58) Field of Classification Search .......... 370/241–253, 370/216–228
See application file for complete search history.

(56) References Cited

U.S. PATENT DOCUMENTS

| | | | |
|---|---|---|---|
| 7,697,440 B2* | 4/2010 | Elie-Dit-Cosaque et al. | 370/241 |
| 7,855,968 B2* | 12/2010 | Elie-Dit-Cosaque et al. | 370/241.1 |
| 8,054,751 B2* | 11/2011 | Elie-Dit-Cosaque et al. | 370/241.1 |
| 2005/0249119 A1* | 11/2005 | Elie-Dit-Cosaque et al. | 370/236 |
| 2005/0249124 A1* | 11/2005 | Elie-Dit-Cosaque et al. | 370/242 |
| 2011/0116363 A1* | 5/2011 | Elie-Dit-Cosaque et al. | 370/216 |

OTHER PUBLICATIONS

IEEE Std 802.1ag; "Virtual Bridged Local Area Networks"; Amendment 5: Connectivity Fault Management; IEEE Computer Society; p. 260, 2007.

* cited by examiner

*Primary Examiner* — Fan Ng
(74) *Attorney, Agent, or Firm* — Baker Botts L.L.P.

(57) ABSTRACT

According to one embodiment, a method may include detecting an occurrence of a fault for a component of a network element having a maintenance entity provisioned thereon. The method may further include transmitting alarm indication suppression messages to components for which the maintenance entity was configured to transmit alarm indication suppression messages in response to detecting the occurrence of the fault.

20 Claims, 2 Drawing Sheets

SYSTEMS AND METHODS FOR TRANSMISSION OF ALARM INDICATION SUPPRESSION MESSAGES IN CONNECTION WITH FAILURE OF NETWORK ELEMENT EQUIPMENT

TECHNICAL FIELD

This invention relates generally to the field of communications systems and more specifically to transmission of alarm indication suppression messages.

BACKGROUND

A communication network may include network elements that route packets through the network. Some network elements may include a distributed architecture, wherein packet processing may be distributed among several subsystems of the network element (e.g., line cards). Certain services, such as Enhanced Internal Sublayer Service (EISS) and Internal Sublayer Service (ISS) defined by IEEE 802.3, are often provisioned on such distributed line cards. Accordingly, removal or failure of such line card may cause the EISS and the ISS of an interface to cease to exist or cease operation.

Service Operation, Administration, and Management ("Service OAM" or "SOAM"), is defined by IEEE 802.1ag and defines Maintenance Entity Group End Points (MEPs) that reside in the EISS or ISS. The ITU Y.1731 standard complements IEEE 802.1ag by allowing a MEP to transmit a Ethernet Alarm Indication Suppression (Eth-AIS) messages in a network direction away from where its peer MEP is located (e.g., in an upstream direction). Such Eth-AIS messages allow for alarms to be suppressed when received by a MEP. Accordingly, when a line card is failed or removed, state machines of the down MEP(s) provisioned on the line card cannot trigger the sending of Eth-AIS frames in an upstream direction of the failed line card. As a result, unnecessary alarms may be raised on the network element and/or at peer MEPs.

SUMMARY OF THE DISCLOSURE

In accordance with the present invention, disadvantages and problems associated with communication of alarm indication suppression messages may be reduced or eliminated.

According to one embodiment, a method may include detecting an occurrence of a fault for a component of a network element having a maintenance entity provisioned thereon. The method may further include transmitting alarm indication suppression messages to components for which the maintenance entity was configured to transmit alarm indication suppression messages in response to detecting the occurrence of the fault.

Certain embodiments of the invention may provide one or more technical advantages. A technical advantage may be that alarm indication suppression messages may be triggered despite removal or failure of hardware upon which services for generating such alarm indication suppression messages are provisioned.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
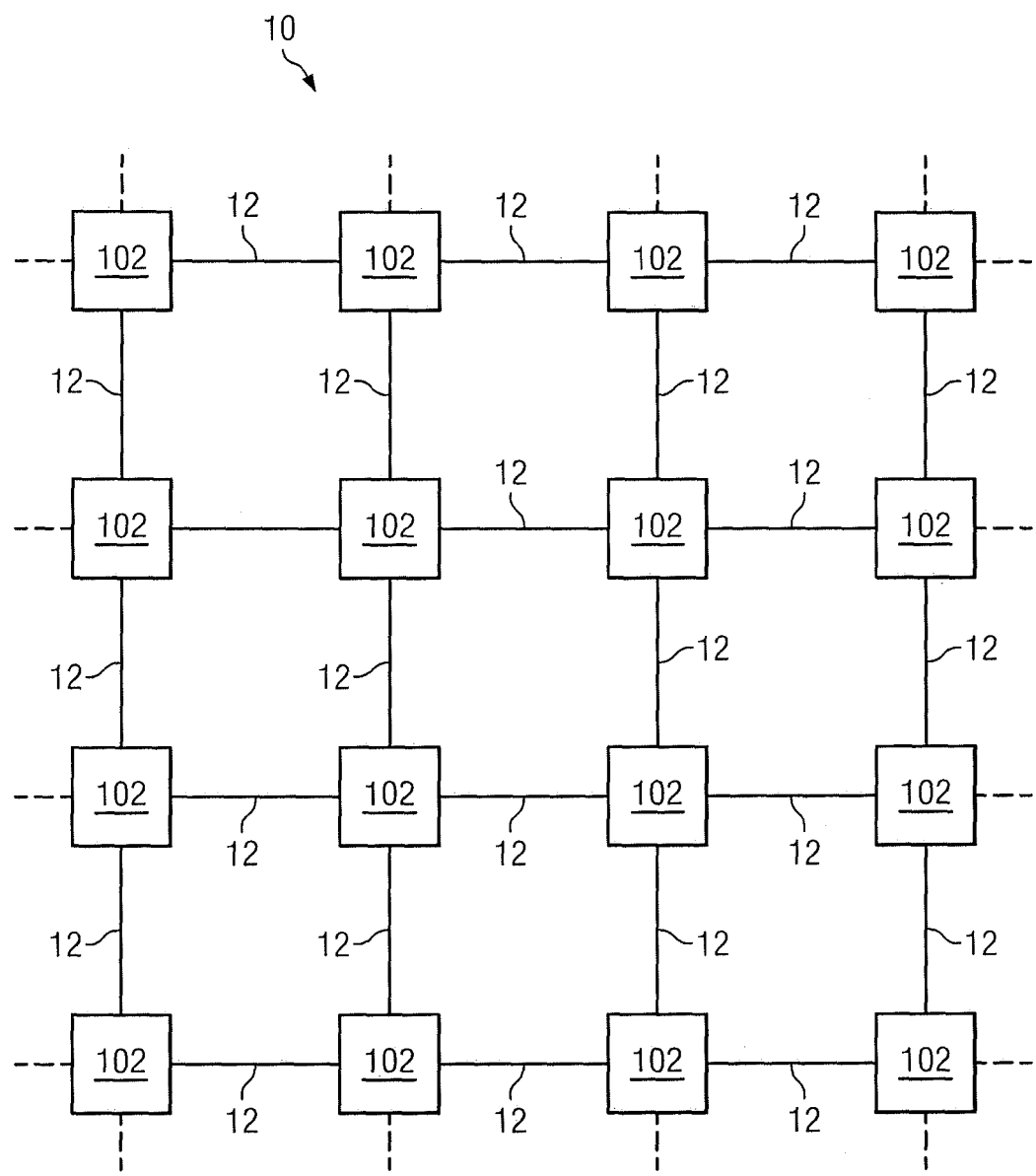
FIG. 1 illustrates a block diagram of an example network, in accordance with certain embodiments of the present disclosure.
Figure 2:
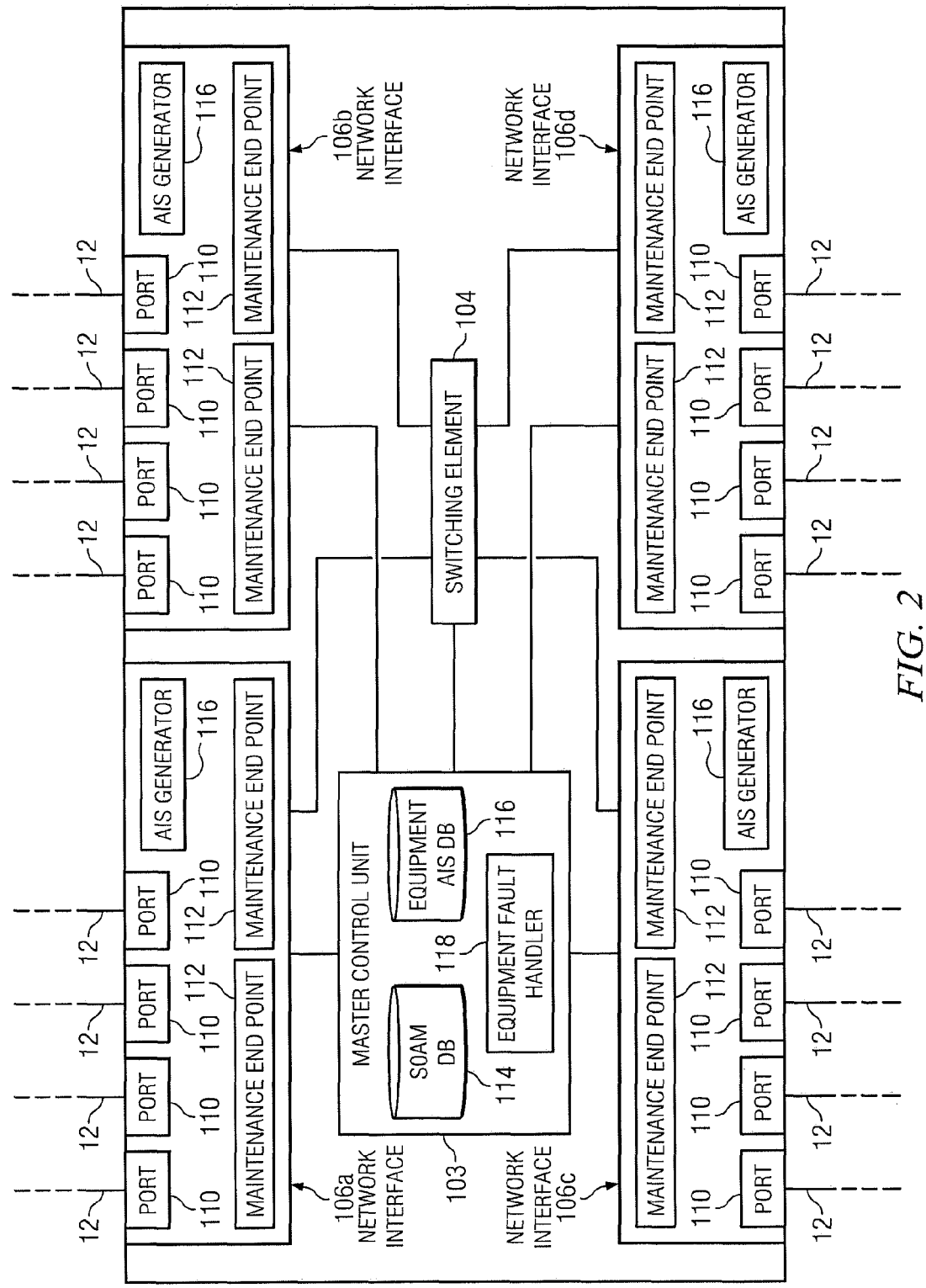
FIG. 2 illustrates a block diagram an example network element, in accordance with certain embodiments of the present disclosure.

Embodiments of the present invention and its advantages are best understood by referring to FIGS. 1-2, like numerals being used for like and corresponding parts of the various drawings.

FIG. 1 illustrates a block diagram of an example network 10, in accordance with certain embodiments of the present disclosure. In certain embodiments, network 10 may be an Ethernet network. Network 10 may include one or more transmission media 12 operable to transport one or more signals communicated by components of network 10. The components of network 10, coupled together by transmission media 12, may include a plurality of network elements 102. In the illustrated network 10, each network element 102 is coupled to four other nodes. However, any suitable configuration of any suitable number of network elements 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 to each other and communicate information between corresponding network devices 102. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each network element 102 in network 10 may comprise any suitable system operable to transmit and receive traffic. In the illustrated embodiment, each network element 102 may be operable to transmit traffic directly to one or more other network elements 102 and receive traffic directly from the one or more other network elements 102. Network elements 102 will be discussed in more detail below with respect to FIG. 2.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

FIG. 2 illustrates a block diagram an example network element 102, in accordance with certain embodiments of the present disclosure. As discussed above, each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. Master control unit 103 may maintain a routing table in accordance with open shortest path first (OSPF) protocol, intermediate system-intermediate system (ISIS) protocol, or any other suitable protocol, wherein such routing table may include any table, database, file, or other data structure configured to maintain information relating a particular ingress port 110 to a corresponding egress port 110.

As shown in FIG. 2, master control unit 103 may include SOAM database 114, equipment AIS database 116, and equipment fault handler 118. SOAM database 114 may be stored in memory and/or other computer readable media, and may include a file, map, list, database, table, or other suitable data structure configured to store routing and connectivity information for maintenance end points 112 provisioned on network interfaces 106. In certain embodiments, SOAM database 114 may be in accordance with the IEEE 802.1ag standard. Equipment AIS database 116 may be stored in memory and/or other computer readable media, and may include a file, map, list, database, table, or other suitable data structure configured to store configuration information required by a maintenance end point 112 to support transmission of alarm indication suppression messages.

Equipment fault handler 118 may be a subcomponent of master control unit 103 (and/or another component of network element 102) and/or a program of instructions configured to execute on master control unit 103 (and/or another component of network element 102). Equipment fault handler 118 may be further configured to, in response to a fault of a network interface 106 upon which a maintenance end point 112 is provisioned, transmit alarm indication suppression messages (e.g., Eth-AIS frames) to components upstream of such maintenance end point 112. Such transmission may be based on information associated with such maintenance endpoint 112 in at least one of the SOAM database 114 and the equipment AIS database 116.

"Fault," as used in this disclosure, shall mean any event which may cause a network interface 106 to become wholly or partially inoperable, including without limitation a failure of such network interface 106 or removal of such network interface 106 from network element 102.

Although SOAM database 114, equipment AIS database 116, and equipment fault handler 118 are depicted in FIG. 2 as being integral components of master control unit 103, other embodiments may exist in which one or more of such components reside outside of master control unit 103, including switching element 104 and/or one or more of network interfaces 106.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port 110 may comprise an Ethernet port, an optical port, or any other suitable port.

Also as shown in FIG. 2, each network interface 106 may have one or more maintenance end points 112 provisioned thereon. A maintenance end point 112 may include an end point of a group of network components associated with a particular maintenance level and may be configured to communicate management traffic, such as heartbeat or hello messages, for example. In certain embodiments, a maintenance end point 112 may include a Maintenance Entity Group End Point (MEP) in accordance with a SOAM standard (e.g., IEEE 802.1ag).

In operation, upon occurrence of a fault of a network interface 106 (e.g., removal or failure of such network interface 106) equipment fault handler 118 may begin handling transmission of alarm indication suppression messages (e.g., Eth-AIS frames) for maintenance end points 112 provisioned on the network interface 106 experiencing the fault condition. Equipment fault handler 118 may use information stored in one or more of SOAM database 114 and equipment AIS database 116 in determining where to transmit such messages.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
   at a network element, detecting an occurrence of a fault for an item of equipment of the network element having a maintenance entity provisioned thereon, the maintenance entity configured to communicate alarm indication suppression messages to one or more components other than the network element, the fault preventing the maintenance entity from communicating an alarm indication suppression message; and
   at an equipment fault handler of the network element coupled to the item of equipment, in response to detecting the occurrence of the fault, transmitting at least one alarm indication suppression message from the equipment fault handler to components for which the maintenance entity was configured to transmit alarm indication suppression messages.

2. A method according to claim 1, further comprising:
   referencing a database configured to store configuration information regarding components for which the maintenance entity is configured to transmit alarm indication suppression messages; and
   transmitting the alarm indication suppression messages based on the contents of the database.

3. A method according to claim 2, wherein the database is a Service Operation, Administration, and Management database in accordance with IEEE 802.1ag.

4. A method according to claim 2, wherein the database is a database configured to store configuration information required by the maintenance entity to support transmission of alarm indication suppression messages.

5. A method according to claim 1, wherein the alarm indication suppression messages comprise Eth-AIS messages in accordance with ITU Y.1731.

6. A method according to claim 1, wherein the fault includes at least one of: a failure of the item of equipment and a removal of the item of the equipment.

7. A method according to claim 1, wherein the item of equipment is a line card.

8. A method according to claim 1, wherein the maintenance entity is a Maintenance Entity Group End Point in accordance with IEEE 802.1ag.

9. A network element comprising:
   a network interface having provisioned thereon a maintenance entity, the maintenance entity configured to communicate alarm indication suppression messages to one or more components other than the network interface;
   a database comprising information regarding components for which the maintenance entity is configured to transmit alarm indication suppression messages; and
   an equipment fault handler coupled to the network interface and configured to, in response to detecting the occurrence of a fault associated with the network interface that prevents the maintenance entity from communicating an alarm indication suppression message, transmit at least one alarm indication suppression message to components for which the maintenance entity is configured to transmit alarm indication suppression messages.

10. A network element according to claim 9, wherein the database is a Service Operation, Administration, and Management database in accordance with IEEE 802.1ag.

11. A network element according to claim 9, wherein the database is a database configured to store configuration information required by the maintenance entity to support transmission of alarm indication suppression messages.

12. A network element according to claim 9, wherein the alarm indication suppression messages comprise Eth-AIS messages in accordance with ITU Y.1731.

13. A network element according to claim 9, wherein the fault includes at least one of: a failure of the network interface and a removal of the network interface.

14. A network element according to claim 9, wherein the network interface is a line card.

15. A network element according to claim 9, wherein the maintenance entity is a Maintenance Entity Group End Point in accordance with IEEE 802.1ag.

16. A network element comprising:
   a processor; and
   a non-transitory computer-readable medium storing:
      logic, when executed by the processor, for detecting at the network element an occurrence of a fault for an item of equipment of the network element having a maintenance entity provisioned thereon, the maintenance entity configured to communicate alarm indication suppression messages to one or more components other than the item of equipment, the fault preventing the maintenance entity from communicating an alarm indication suppression message; and
      logic, when executed by the processor, for transmitting at least one alarm indication suppression message from an equipment fault handler of the network element coupled to the item of equipment to components for which the maintenance entity was configured to transmit alarm indication suppression messages in response to detecting the occurrence of the fault.

17. A network element according to claim 16, further comprising:
   logic for referencing a database configured to store configuration information regarding components for which the maintenance entity is configured to transmit of alarm indication suppression messages; and
   logic for transmitting the alarm indication suppression messages based on the contents of the database.

18. A network element according to claim 17, wherein the database is a Service Operation, Administration, and Management database in accordance with IEEE 802.1ag.

19. A network element according to claim 17, wherein the database is a database configured to store configuration information required by the maintenance entity to support transmission of alarm indication suppression messages.

20. A network element according to claim 16, wherein the alarm indication suppression messages comprise Eth-AIS messages in accordance with ITU Y.1731.

* * * * *